(12) United States Patent
Morris

(10) Patent No.: US 10,050,906 B2
(45) Date of Patent: Aug. 14, 2018

(54) VIRTUAL NODE HAVING SEPARATE CONTROL AND DATA PLANES

(71) Applicant: Verizon Patent and Licensing Inc., Basking Ridge, NJ (US)

(72) Inventor: Nicklous D. Morris, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 503 days.

(21) Appl. No.: 14/691,746

(22) Filed: Apr. 21, 2015

(65) Prior Publication Data
US 2016/0315879 A1    Oct. 27, 2016

(51) Int. Cl.
*H04L 12/937* (2013.01)
*H04L 12/931* (2013.01)

(52) U.S. Cl.
CPC ............ *H04L 49/254* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 5,651,005 A | * | 7/1997 | Kwok | H04L 49/253 370/399 |
| 2003/0095500 A1 | * | 5/2003 | Cao | H04J 14/0227 370/216 |
| 2013/0322457 A1 | * | 12/2013 | Budhia | H04L 49/253 370/401 |
| 2014/0269710 A1 | * | 9/2014 | Sundaram | H04L 45/302 370/392 |
| 2015/0195178 A1 | * | 7/2015 | Bhattacharya | H04L 45/745 718/1 |

OTHER PUBLICATIONS

IEEE Std 802.1BR-2012, "Virtual Bridged Local Area Networks—Bridge Port Extension", Jul. 12, 2012.*

* cited by examiner

*Primary Examiner* — James P Duffy

(57) ABSTRACT

A controller is coupled by a connection box to layer two nodes, such as top-of rack (TOR) switches. The controller manages control plane operations and forwards port extension data, such as IEEE 802.1BR protocol data to the connection box and the layer two nodes. The port extension data included information identifying a virtual path that includes ports in the connection box and one or more of the nodes. The connection box and the nodes handle forwarding plane operations. The virtual path is associated with the destination, such as a client device or a server device, and the port extension data causes traffic intended for the destination to be forwarded to the destination via the virtual path.

20 Claims, 11 Drawing Sheets

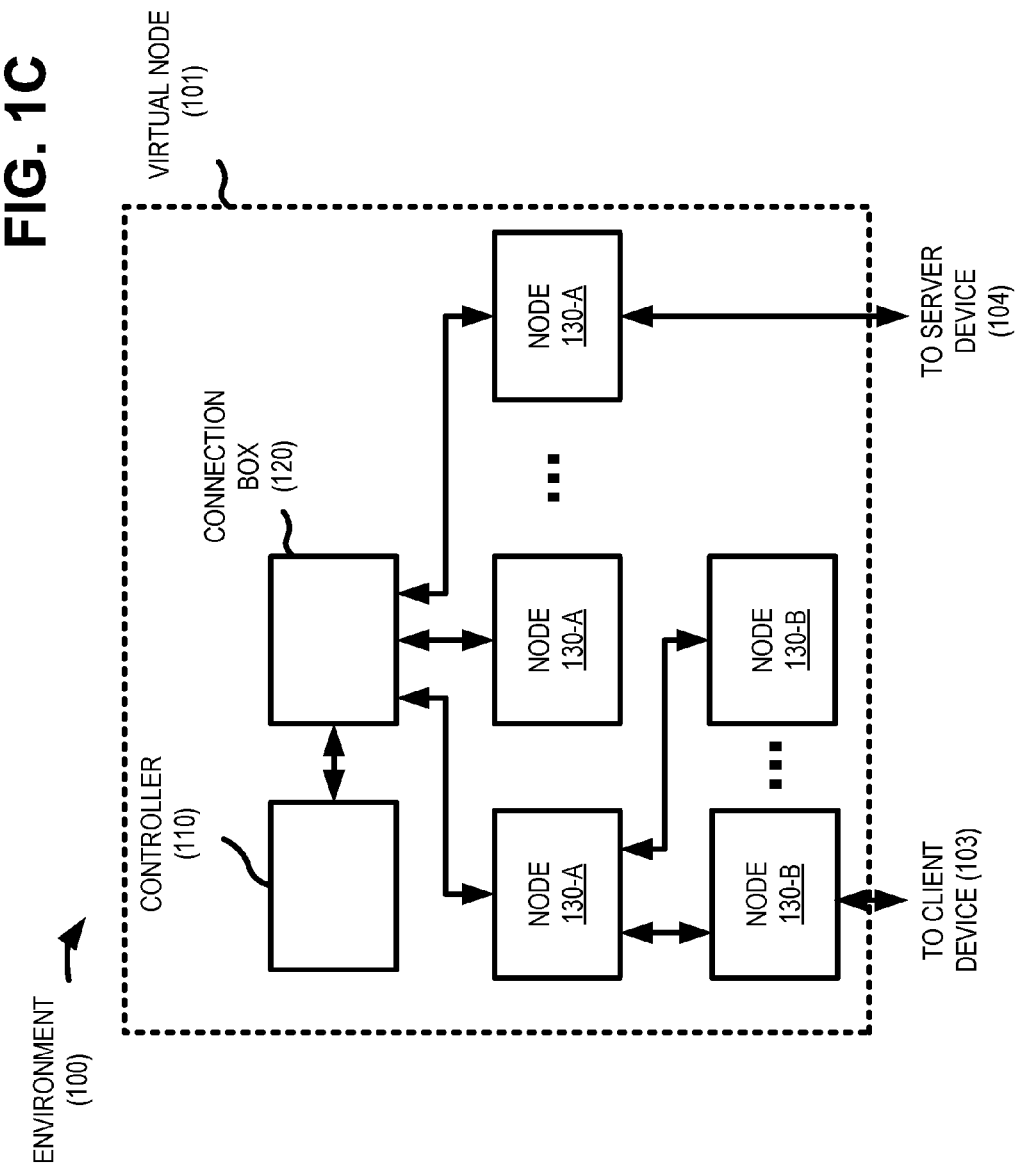

VIRTUAL NODE HAVING SEPARATE CONTROL AND DATA PLANES

BACKGROUND INFORMATION

A data center is a facility used to house computer systems and associated components, such as racks of telecommunications and storage systems. For example, a data center may be run by an Internet service provider for the purpose of hosting its own servers and third party servers. A typical data center network includes network elements, such as hosts, load-balancers, routers, switches, etc. With the deployment of high-density servers and blade servers, data centers may include a relatively large number of Ethernet switches. In addition, deployment of virtualization technology within servers has resulted in an even further increase in the number of installed switches. These switches are typically embedded within a server itself and/or are directly coupled to the server.

BRIEF DESCRIPTION OF THE DRAWINGS

FIGS. 1A-1E are diagrams illustrating an exemplary environment according to implementations described herein;

DETAILED DESCRIPTION OF PREFERRED EMBODIMENTS

Figure 1A:
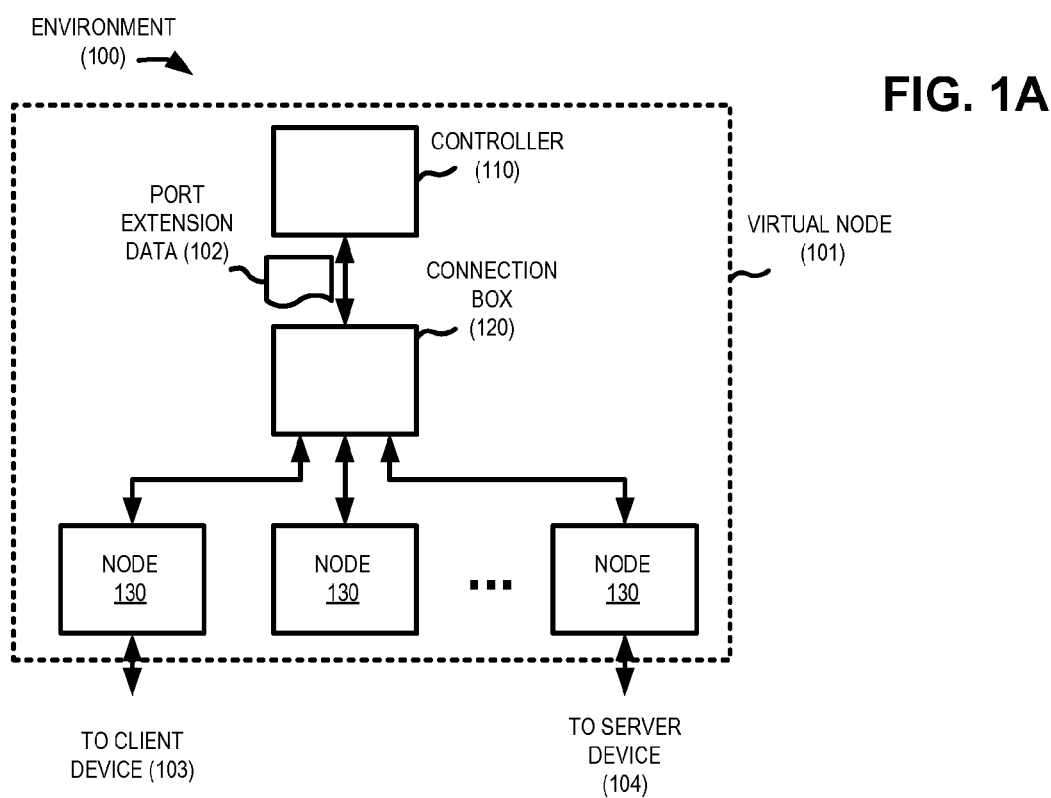

The following detailed description refers to the accompanying drawings. The same reference numbers in different drawings identify the same or similar elements.

FIGS. 1A-1E show an exemplary environment 100 in which the systems and/or methods, described herein, may be implemented. As shown in FIGS. 1A-1E, environment 100 may include, for example, a controller 110, a connection box 120, and one or more nodes 130. As described below, controller 110, connection box 120, and nodes 130 may combine to form a virtual node 101 to handle and forward data based on port extension data 102 generated by controller 110. For example, virtual node 101 may provide a data connection between client device 103 and server device 104.

Controller 110 may include a data transfer device, such as a router, a gateway, a switch (e.g., an asynchronous transfer mode (ATM) switch, Ethernet switch, etc.), a firewall, a network interface card (NIC), a hub, a bridge, a proxy server, an optical add-drop multiplexer (OADM), a line access multiplexer (LAM), or some other type of device that processes and/or transfers data.

Controller 110 may function to distribute port extension data 102 that may be used by nodes 130 to define port extenders (PE) that are used to efficiently forward traffic through virtual node 101. As used herein, a PE is a component for extending or connecting ports within controller 110 to ports of nodes 130 using multiple logical connections that include ports of connection box 120. As described below, controller 110 may collectively control PEs included in controller 110, connection box 120, and multiple nodes 130 so that the various ports of connection box 120 and multiple nodes 130 switches may operate as ports of controller 110.

In one implementation, controller 110 may generate port extension data 102 based on the Institute of Electrical and Electronics Engineering (IEEE) 802.1BR and/or other port extensions technologies (e.g., Virtual Embedded Bridge (VEB) or Edge Virtual Bridging (EVB) with virtual Ethernet port aggregator (VEPA) under IEEE 802.1Qbh). For example, controller 110 may generate port extension data 102 based on Port Extender Control and Status Protocol (PE CSP) under IEEE 802.1BR, and controller 110 may use port extension data 102 to assert control over and retrieve status information from associated PEs in connection box 120 and nodes 130. Controller 110 and its PEs within connection box 120 and nodes 130 may combine to constitute a single virtual node 101 that operates as a standard IEEE 802.1Q bridge that supports virtual local area networks (VLANs) on an Ethernet network.

For example, port extension data 102 may include information associating an identifier or physical address for a device, such as a media access control (MAC) address with a virtual path identifier. Port extension data 102 may further include data identifying, as the PEs, one or more physical ports in controller 110, connection box 120, and one or more nodes 103 that are associated with the virtual path identifier. For example, when a node 130 receives data, the node 130 may identify a physical address associated with an intended destination for the received data. The node 130 may use the port extension data 102 to determine a virtual path identifier associated with the physical address of a destination device, and the node 130 may modify the received data, intended for the destination device, to include the virtual path identifier and/or related information. The node 130 may then forward the received data based on the virtual path identifier along a path that includes the PEs associated with the virtual path identifier. In this manner, data received by connection box 120 and/or node 130 may be forwarded based on the virtual path identifier without significant processing and as if the data was received in a port of controller 110.

In 802.1BR, an E-channel is a bidirectional path through virtual node 101 that includes one or more PEs, such as a path between client device 103 and server device 104. An E-channel Identifier (E-CID) may correspond to an alphanumeric value to identify the E-channel, and an E-tag may correspond to data that includes the E-CID and is added to received data to cause the received data to be transmitted through virtual node 101 via the associated E-channel. Controller 110 may connect to nodes 130, via connection box 120, using logical E-channels, and the E-channels may appear as virtual ports in controller 110. Controller 110 may manage all the virtual ports and the associated traffic.

In one implementation, controller 110 may implement a hypervisor (also known as a virtual machine monitor (VMM)). A hypervisor may include computer software, firmware or hardware that creates and runs virtual machines to implement communications via a PEs in a virtual channel. For example, the hypervisor may operate on a host machine, to enable one or more virtual machines (VMs), and the hypervisor may provide a virtual operating platform to the virtual machines and may manage the execution of the operating platform. For example, controller 110 may implement virtual node 101 as a virtual server that mimics a traditional external layer 2 (L2) switch or bridge for connecting VMs included in blade servers coupled to client device 103 and/or server device 104. Virtual node 101 may communicate between VMs on a single physical server, or may connect VMs via an external network.

For example, virtual node 101 may include a hypervisor to implement PEs in network interface controllers (NICs). In virtual node 101, the hypervisor may abstract and share physical NICs among multiple virtual machines (e.g., nodes 130) to create virtual NICs for each virtual machine. The physical NIC may act as the uplink to the external network connecting client device 103/server device 104 to virtual node 101, and the hypervisor may implement one or more software-based virtual switches to connect the virtual NICs to the physical NICs. Data traffic received by a physical NIC may be passed to a hypervisor, and the hypervisor may use configuration information extracted from port extension data 102 to forward the traffic to VMs in the correct PEs. When a VM in a PE transmits traffic from a virtual NIC, the traffic may be forwarded to the physical NIC if the destination is a PE included in a different physical device (e.g., on another node 130). If the destination is a PE included in the same physical device (e.g., on the same node 130), the hypervisor may forward the traffic directly back to a VM associated with the PE.

Controller 110 may identify ports in a path connecting two devices (e.g., client device 103 and/or server device 104). For example, controller 110 may perform virtual station interface (VSI) discovery protocol (VDP) under IEEE 802.1BR to identify MAC addresses associated with various ports within connection box 120 and/or nodes 130. Controller 110 may further use VDP to identify available paths within virtual node 101 (e.g., paths using ports that are not already allocated to a logical path) and to assign one or more of the paths to a virtual path between two devices (e.g., between client device 103 and server device 104). Controller 110 may generate port extension data 102 that may be used by a node 130 to insert E-tags into received data to map the physical ports in controller 110, connection box 120, and/or nodes 130 as virtual ports of PEs in virtual node 101 and the E-tags may control how the virtual ports forward the data and how the virtual ports replicate broadcast or multicast traffic.

In certain implementations, controller 110 may allocate ports within virtual node 101 so that the resulting E-channel has desired performance criteria for transmitting traffic (e.g., desired levels of bandwidth, packet drops, latency, transmission time, and/or jitter). Controller 110 may monitor transmission on the physical channels between the discovered ports, and may select an aggregate end-to-end path, from among available paths, that achieves the desired performance criteria. The desired performance criteria may be identified based on a contractual agreement, such as a quality of service (QoS) identified in a key performance indicator (KPI) associated with the source, destination, and/or intermediary devices, enforcement of an access control list (ACL), etc.

When controller 110 discovers physical and/or virtual ports in a device (e.g., when a node 130 is connected to connector box 120), controller 110 may instantiate and manage the discovered ports as if they are included in an inserted line card (commonly referred to as a virtual NIC).

Controller 110 may include a memory to store a data structure or other data identifying a discovered port (e.g., MAC addresses of an associated device) and the status of the port. The data structure may further identify whether the port is allocated to an E-channel. Additionally or alternatively, the data structure may further identify other ports within the same device and/or within another device that connect to the discovered port.

Returning to FIG. 1A, connection box 120 in environment 100 may function to provide a connection between controller 110 and multiple nodes 130. For example, connection box 120 may include "north-bound" ports that enable connections to ports of controller 110 and "south-bound ports" that enable connections to ports of nodes 130. For example, connection box 120 may correspond to large chassis switch box that includes a fabric connecting the north-bound and south-bound ports. In one implementation, connection box 120 may not include any type of controlling processing unit to identify and manage ports in nodes 130. For example, connection box 120 may include data plane processing to forward data, while controller 110 includes control plane processing that controls decision making processes associated with forwarding data by connection box 120.

Node 130 may include a point of entry into the communication network at a data center, mobile switching center (MSC), central office, or any other of point of presence. Node 130 may be responsible for transmitting data between networking devices located in the same rack as well as between networking devices located in different racks. In one implementation, connection box 120 may be included in or otherwise associated with a mounting rack, and nodes 130 may include one or more top-of-rack (TOR) switches positioned on the rack. Although referred to in this application as "top-of-rack" switches, each node 130 may not actually be positioned on top of the rack associated with connection box 120. For example, a node 130 may be located elsewhere, such as below the rack, beside the rack, or completely displaced away from the rack, determined in part by the nature of the connections made to each node 130 and another device, such as connection box 120 or another node 130. In other implementations, node 130 may correspond to other types of bridges, including virtual Ethernet bridges (VEBs), edge virtual bridging (EVB) with virtual Ethernet port aggregator (VEPAs), individual VMs, physical services, devices providing transparent services, etc.

As previously described, node 130 may tag received data to include information identifying a virtual path (e.g., an E-channel) through virtual node 101. For example, node 130 may modify received data to include an E-tag in accordance with IEEE 802.1BR. Examples of contents included in an E-tag are described below in Table 1.

TABLE 1

E-tag Contents

| Field Name | Contents Description |
|---|---|
| E-tag EtherType | A field that is used to indicate that tagged data is to be transmitted via PEs in an E-channel based on the contents of the E-tag |
| Priority Code Point (PCP) | A field identifying a priority bit value that is used to identify a priority class for the data |
| Drop Eligible Indicator (DEI) | A field indicating whether the tagged data may be dropped during congestion and may be used to identify a priority class for the data |
| E-channel identifier (ECID) | A field identifying an E-channel for carrying the data toward an intended destination device |
| Source ECID | A field identifying a PE that inserted the E-tag into the data |

TABLE 1-continued

E-tag Contents

| Field Name | Contents Description |
|---|---|
| Hub Identifier | A field identifying a PE included in connection box 120 |

A node 130 may direct data that includes an E-tag based on the contents of the E-tag. For example, node 130 may direct the data to a port included in a particular E-channel based on the ECID value included in the E-tag.

Figure 1B:
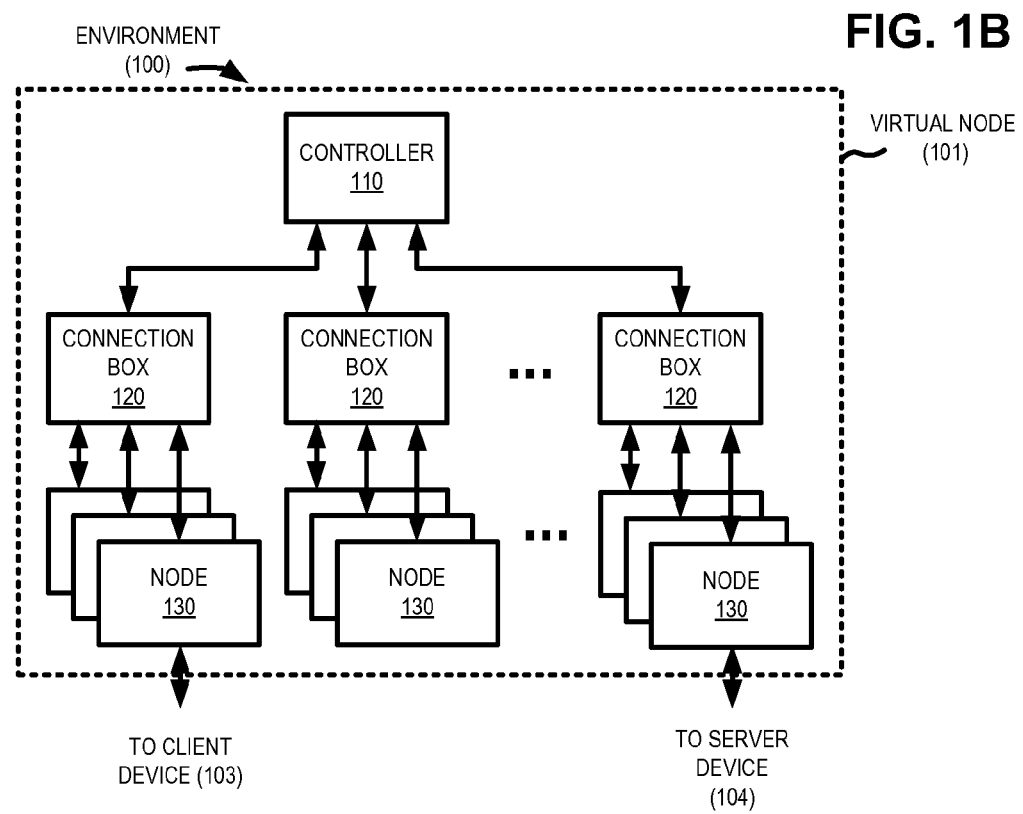

In one implementation shown in FIG. 1B, environment 100 may include a controller 110 that is coupled to multiple connection boxes 120 and, in turn, each of the connection boxes 120 may be connected to a separate set of nodes 130. In this way, controller 110 may be connected to and manage ports included in a relatively large quantity of nodes 130. Furthermore, controller 110 may connect two devices (e.g., client device 103 and server device 104) via a virtual path that includes ports in two separate connection boxes 120.

In some implementations, controller 110 may manage ports in cascaded devices. In one example shown in FIG. 1C, controller 110 may establish a virtual path to a device (e.g., client device 103) via a virtual path that includes ports in multiple nodes 130. For example, controller 110 (and connection box 120) may connect to client device 103 via a first node 130-A and a second node 130-B.

Figure 1D:
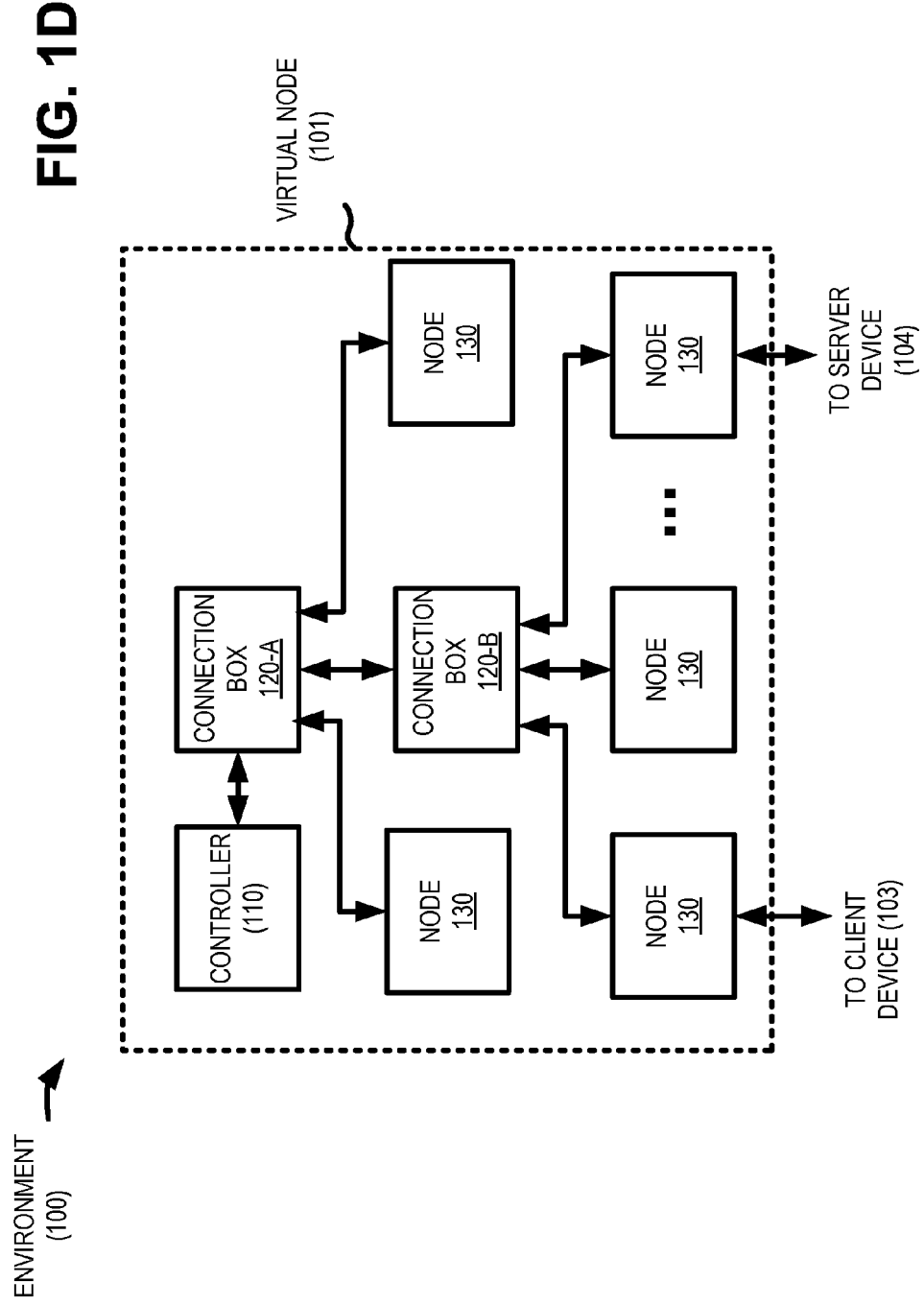

In another example shown in FIG. 1D, controller 110 may establish a virtual path to a device (e.g., client device 103) via a virtual path that includes ports in multiple connection boxes 120. For example, controller 110 may connect to client device 103 via a first connection box 120-A and a second connection box 120-B. As further shown in FIG. 1D, first connection box 120-A may be connected to both second connection box 120-B and one or more nodes 130.

Figure 1E:
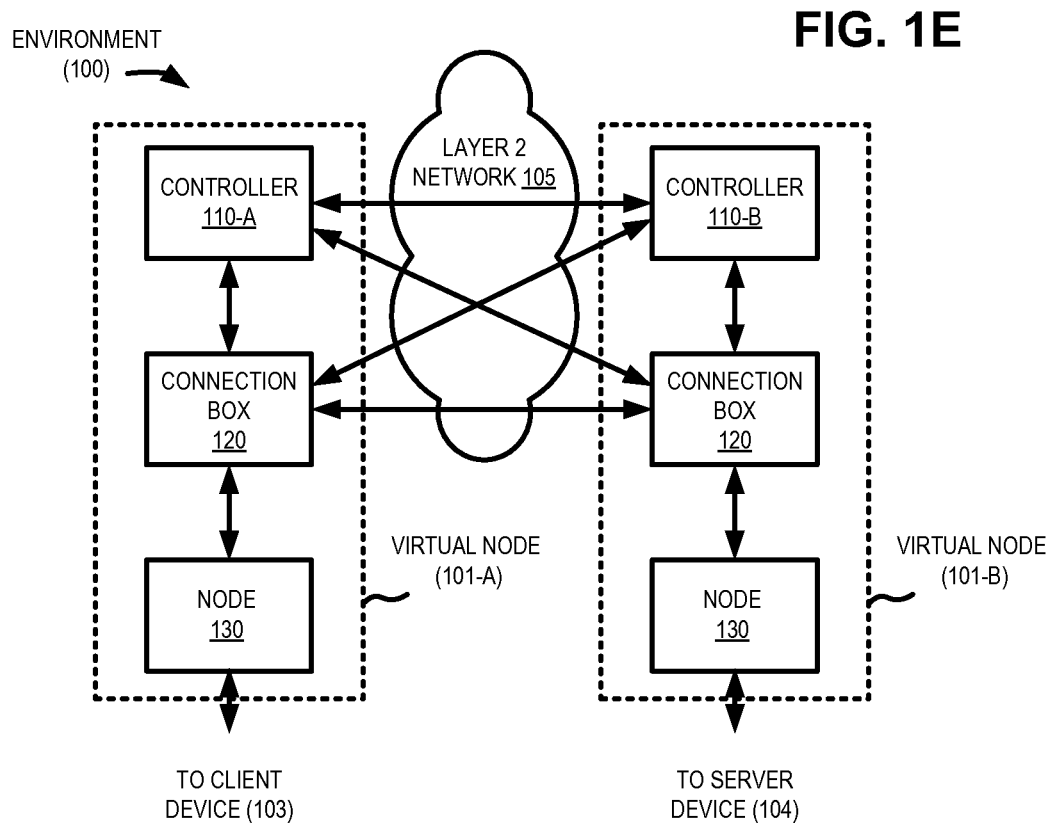

In one implementation shown in FIG. 1E, environment 100 may include a virtual path between two devices (e.g., client device 103 and server device 104) that includes ports in two controllers 110. For example, a first portion of the virtual path may extend through a first virtual node 101-A associated with a first controller 110-A, and a second portion of the virtual path may extend through a second virtual node 101-B associated with a second controller 110-B. The two portions of the virtual path may be coupled by a layer two network 105, such as a network that includes one or more intermediate switches. In this example, first controller 110-A and second controller 110-B may exchange data so that first controller 110-A may generate and forward port extension data 102 that enables a node 130 to exchange data with client device 103 via a virtual path that includes a node 130 that is not managed by first controller 110 and is, instead, managed by second controller 110-B.

Although FIGS. 1A-1E shows exemplary components of environment 100, in other implementations, environment 100 may include fewer components, different components, differently arranged components, and/or additional components than depicted in FIGS. 1A-1E. Additionally or alternatively, one or more components of environment 100 may perform one or more tasks described as being performed by one or more other components of environment 100.

Figure 2:
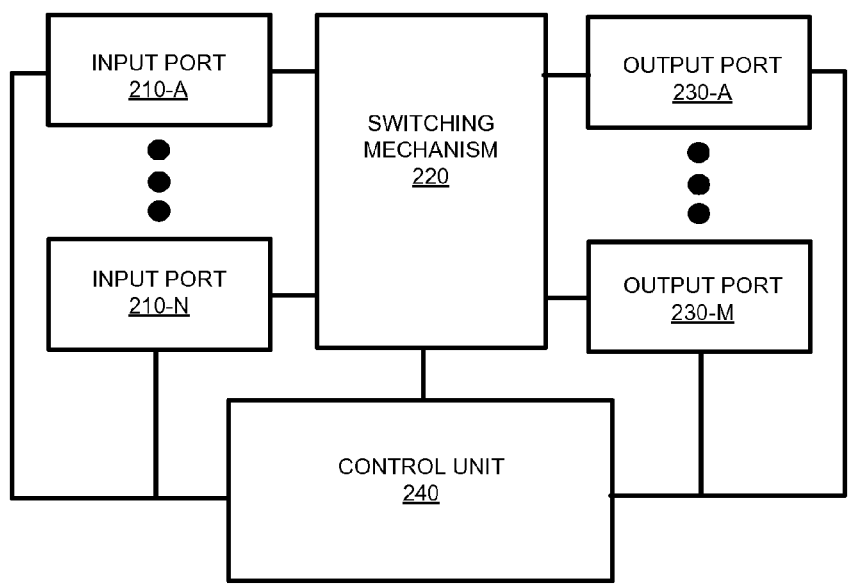
FIG. 2 is a diagram illustrating exemplary components of a controller that may be included in the environment of FIGS. 1A-1E.

FIG. 2 is a diagram illustrating exemplary components of a routing device 200. In certain implementations, a controller 110 may include one or more routing devices 200. It should be appreciated, however, that controller 110 may not include a routing device 200 and may include, instead, a different type of network device, such as a switch, bridge, server, relay, etc. As shown in FIG. 2, routing device 200 may include one or more input ports 210-A to 210-N (referred to herein individually as "input port 210" and collectively as "input ports 210"), a switching mechanism 220, one or more output ports 230-A to 230-M (referred to herein individually as "output port 230" and collectively as "output ports 230"), and a control unit 240.

Input ports 210 may be the points of attachments for physical links and may be the points of entry for incoming traffic. An input port 210 may be associated with an interface card, a line card, an extender, a breakout card, etc. Input port 210 may perform some or all of data plane processing associated with an incoming packet. Data plane processing may encompass looking up a destination address for an incoming packet, removing (or changing) a label associated with the packet, determining a path through switching mechanism 220, and/or filtering the packet based on one or more filters.

Switching mechanism 220 may include one or more switches and/or switch fabrics to facilitate communication between input ports 210 and output ports 230. In one implementation, each of the switch fabrics may include a single or multi-stage switch of crossbar elements. In another implementation, each of the switches/switch fabrics may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card. Output port 230 may perform some or all of data plane processing associated with an outgoing packet. For example, output port 230 may classify the packet based on a quality of service class, schedule the packet in a particular queue, add (or change) a label associated with the packet, and/or filter the packet based on one or more firewall filters.

Control unit 240 may interconnect with input ports 210, switching mechanism 220, and/or output ports 230 and may control operation of routing device 200. For example, control unit 240 may perform control plane processing for virtual node 101, such as discovering ports included in devices coupled to input ports 210 and/or output ports 230 and further allocate the discovered ports to one or more virtual paths. Control unit 240 may further generate and forward, to the devices, port extension data 102 identifying the virtual paths and the ports allocated to the virtual paths.

Although FIG. 2 shows exemplary components of routing device 200, in other implementations, routing device 200 may include fewer components, different components, differently arranged components, and/or additional components than depicted in FIG. 2. Additionally or alternatively, one or more components of routing device 200 may perform one or more tasks described as being performed by one or more other components of routing device 200.

Figure 3:
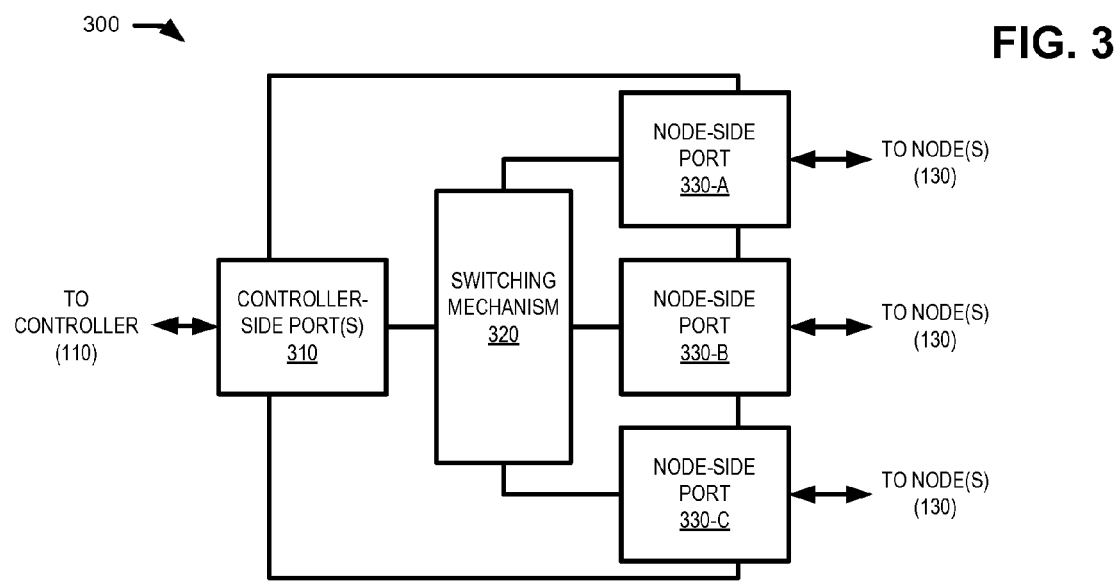
FIG. 3 is a diagram illustrating exemplary components of a connection box that may be included in the environment of FIGS. 1A-1E.

FIG. 3 is a diagram illustrating exemplary components of a port expander device 300. In certain implementations, connection box 120 may include one or more port expander devices 300. As shown in FIG. 3, port expander device 300 may include one or more controller-side ports 310 (referred to herein individually as "controller-side port 310" and collectively as "controller-side ports 310"), a switching mechanism 320, and one or more node-side ports 330-A to 330-C (referred to herein individually as "node-side port 330" and collectively as "node-side ports 330").

Controller-side ports 310 may be the points of attachments for physical and/or virtual links for exchanging traffic with controller 110. Switching mechanism 320 may include one or more switches and/or switch fabrics to facilitate communication between controller-side ports 310 and node-side ports 330. The switch fabric of switching mechanism 320 may include a single or multi-stage switch of crossbar elements or may include some other form(s) of switching elements. Additionally or alternatively, switching mechanism 320 may include one or more processors, one or more memories (e.g., queues for storing data waiting to be sent via controller side-ports 310 and/or node-side ports 330), and/or one or more paths that permit communication between controller-side ports 310 and node-side ports 330. Node-side ports 330 may be the points of attachments for physical links for exchanging traffic with one or more nodes 130.

In one implementation, port expander device 300 may not include hardware, software, or a combination thereof to manage PEs associated with controller side port 310 and/or node-side ports 330. Instead, as described above with respect to FIGS. 1A-1E, controller 110 may discover and manage controller side ports 310 and node-side ports 330 to define one or more PEs to be included in virtual paths. In this way, controller 110 and connection box 120 may be separately selected as needed to achieve desired performance criteria. For example, as described above with respect to FIG. 1B, a controller 110 may be used to perform control plane processing to generate port extension instructions for multiple connection boxes 120, which then perform data plane processing associated with forwarding the data. In a second example, virtual node 101 may include multiple controllers 110, such as a first controller 110 to provide first port extension data 102 for handling a first type of traffic and a second controller 110 to generate second port extension data 102 for handling a second type of traffic. In this second example, the first controller 110 may establish and maintain a first set of virtual paths through connection box 120 and/or nodes 130, and the second controller 110 may establish and maintain a second set of virtual paths through connection box 120 and/or nodes 130.

For instance, controller side ports 310 and/or node-side ports 330 may forward received data based on port extension data 102 generated by controller 110. A controller side port 310 or a node-side port 330 may parse received data to identify a virtual path identifier (e.g., an ECID) and a destination PE associated with the data. The controller side port 310 or node-side ports 330 may access port extension data 102 to identify, for example, a path through switching mechanism 320 allocated to the virtual path and may direct the received data toward the destination PE via the identified path.

Although FIG. 3 shows exemplary components of port expander device 300, in other implementations, port expander device 300 may include fewer components, different components, differently arranged components, and/or additional components than depicted in FIG. 3. Additionally or alternatively, one or more components of port expander device 300 may perform one or more tasks described as being performed by one or more other components of port expander device 300.

Figure 4:
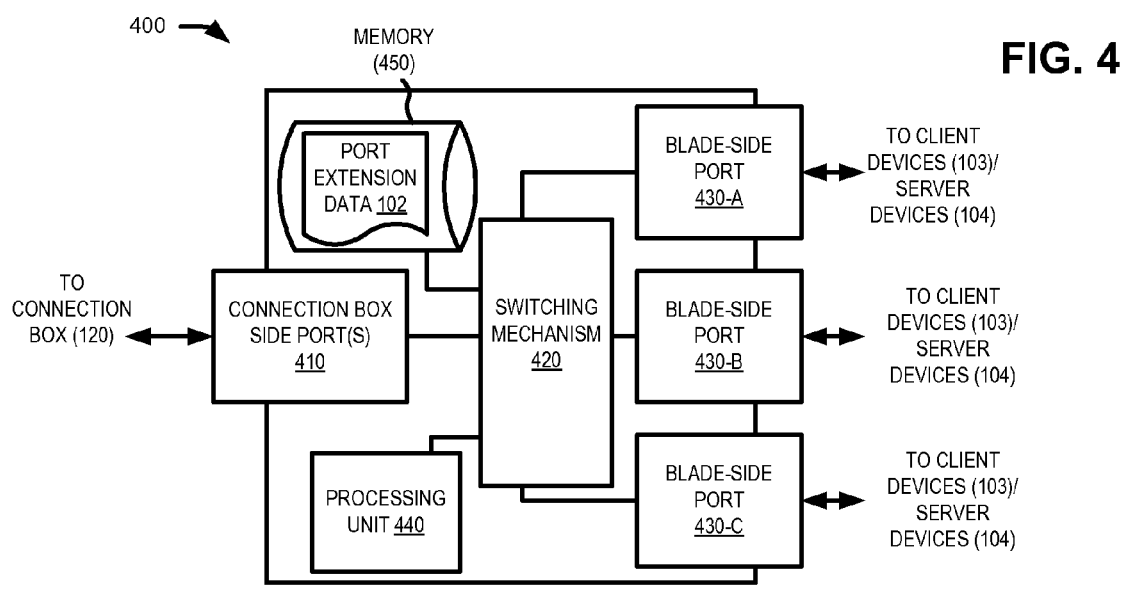
FIG. 4 is a diagram illustrating exemplary components of a node that may be included in the environment of FIGS. 1A-1E.

FIG. 4 is a diagram illustrating exemplary components of a layer two device 400. In certain implementations, a node 130 may include one or more layer two devices 400. Layer two device 400 may correspond, for example, to a switch, such as a TOR switch. As shown in FIG. 4, layer two device 400 may include one or more connection box-side ports 410 (referred to herein individually as "connection box-side port 410" and collectively as "connection box-side ports 410"), a switching mechanism 420, one or more blade-side ports 430-A to 430-C (referred to herein individually as "blade-side port 430" and collectively as "blade-side ports 430"), a processing unit 440, and a memory 450 to store port extension data 102.

Connection box-side ports 410 may be the points of attachments for physical links for exchanging data with connection box 120. For example, layer two device 400 may receive port extension data 102 via connection box-side ports 410.

Switching mechanism 420 may include one or more switches and/or switch fabrics to facilitate communication between connection box-side ports 410 and blade-side ports 430. The switch fabrics may include a single or multi-stage switch of crossbar elements or some other form(s) of switching elements. Additionally or alternatively, switching mechanism 420 may include one or more processors, one or more memories, and/or one or more paths that permit communication between connection box-side ports 410 and blade-side ports 430.

Blade-side ports 430 may be the points of attachments for physical links for exchanging data with one or more devices external to virtual node 101, such as server blades connected to client device 103 and/or server device 104. A blade-side port 430 may be associated with NIC or other interface card, a line card, an extender, a breakout card, etc. Blade-side port 430 may perform some or all of data plane processing associated with a packet (or other data unit) received from or to be forwarded to the external device. For example, data plane processing by processing unit 440 may include determining a destination (e.g., MAC address) address for an incoming packet, identifying (e.g., based on port extension data 102) a virtual channel for carrying the incoming packet, modifying the packet to include a label associated with the virtual channel, determining a next PE in the virtual path to receive the packet, determining a path through switching mechanism 420 toward the next PE, and forwarding the packet via the determined path to a connection box-side port 410.

Processing unit 440 may interconnect with connection box-side ports 410, switching mechanism 420, and/or blade-side ports 430 and may control operation of layer two device 400. For example, processing unit 440 may communicate with controller 110 to obtain port extension data 102 and may store port extension data 102 to memory 450 for access by blade-side ports 430.

Although FIG. 4 shows exemplary components of a layer two device 400, in other implementations, the layer two device 400 may include fewer components, different components, differently arranged components, and/or additional components than depicted in FIG. 4. Additionally or alternatively, one or more components of a layer two device 400 may perform one or more tasks described as being performed by one or more other components of the layer two device 400.

Figure 5:
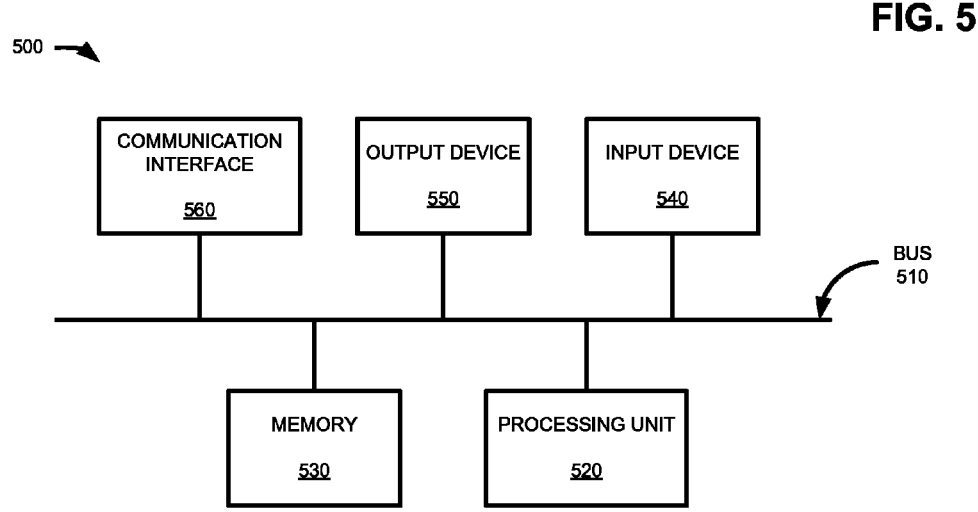
FIG. 5 is a diagram illustrating exemplary components of a computing device that may be included in the environment of FIGS. 1A-1E.

FIG. 5 is a diagram illustrating exemplary functional components of a computing device 500 according to an implementation described herein. Controller 110 and/or a node 130 may each include one or more computing devices 500. As shown in FIG. 5, computing device 500 may include a bus 510, a processing unit 520, a memory 530, an input device 540, an output device 550, and a communication interface 560.

Bus 510 may include a path that permits communication among the components of computing device 500. Processing unit 520 may include any type of single-core processor, multi-core processor, microprocessor, latch-based processor, and/or processing logic (or families of processors, microprocessors, and/or processing logics) that interprets and executes instructions. In other embodiments, processing unit 520 may include an application-specific integrated circuit (ASIC), a field-programmable gate array (FPGA), and/or another type of integrated circuit or processing logic.

Memory 530 may include any type of dynamic storage device that may store information and/or instructions, for execution by processing unit 520, and/or any type of non-volatile storage device that may store information for use by processing unit 520. For example, memory 530 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 540 may allow an operator to input information into computing device 500. Input device 540 may include, for example, a keyboard, a mouse, a pen, a microphone, a remote control, an audio capture device, an image and/or video capture device, a touch-screen display, and/or another type of input device. In some embodiments, computing device 500 may be managed remotely and may not include input device 540. In other words, computing device 500 may be "headless" and may not include a keyboard, for example.

Output device 550 may output information to an operator of computing device 500. Output device 550 may include a display, a printer, a speaker, and/or another type of output device. For example, computing device 500 may include a display, which may include a liquid-crystal display (LCD) for displaying content to the customer. In some embodiments, computing device 500 may be managed remotely and may not include output device 550. In other words, computing device 500 may be "headless" and may not include a display, for example.

Communication interface 560 may include a transceiver that enables computing device 500 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 560 may include a transmitter that converts baseband signals to radio frequency (RF) signals and/or a receiver that converts RF signals to baseband signals.

Communication interface 560 may include and/or may be coupled to an antenna for transmitting and receiving RF signals. For example, communication interface 560 may be coupled to an antenna assembly that includes one or more antennas to transmit and/or receive RF signals. The antenna assembly may, for example, receive data from communication interface 560 and transmit RF signals associated with the data, or the antenna assembly may receive RF signals and provide them to communication interface 560 to be processed.

Communication interface 560 may include a logical component that includes input and/or output ports, input and/or output systems, and/or other input and output components that facilitate the transmission of data to other devices. For example, communication interface 560 may include a network interface card (e.g., Ethernet card) for wired communications and/or a wireless network interface (e.g., a WiFi) card for wireless communications. Communication interface 560 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, computing device 500 may perform certain operations, and computing device 500 may perform these operations in response to processing unit 520 executing software instructions contained in a computer-readable medium, such as memory 530. A computer-readable medium may be defined as a non-transitory memory device. A memory device may be implemented within a single physical memory device or spread across multiple physical memory devices. The software instructions may be read into memory 530 from another computer-readable medium or from another device. The software instructions contained in memory 530 may cause processing unit 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of computing device 500, in other implementations, computing device 500 may include fewer components, different components, additional components, or differently arranged components than those depicted in FIG. 5. Additionally or alternatively, one or more components of computing device 500 may perform one or more tasks described as being performed by one or more other components of computing device 500.

Figure 6:
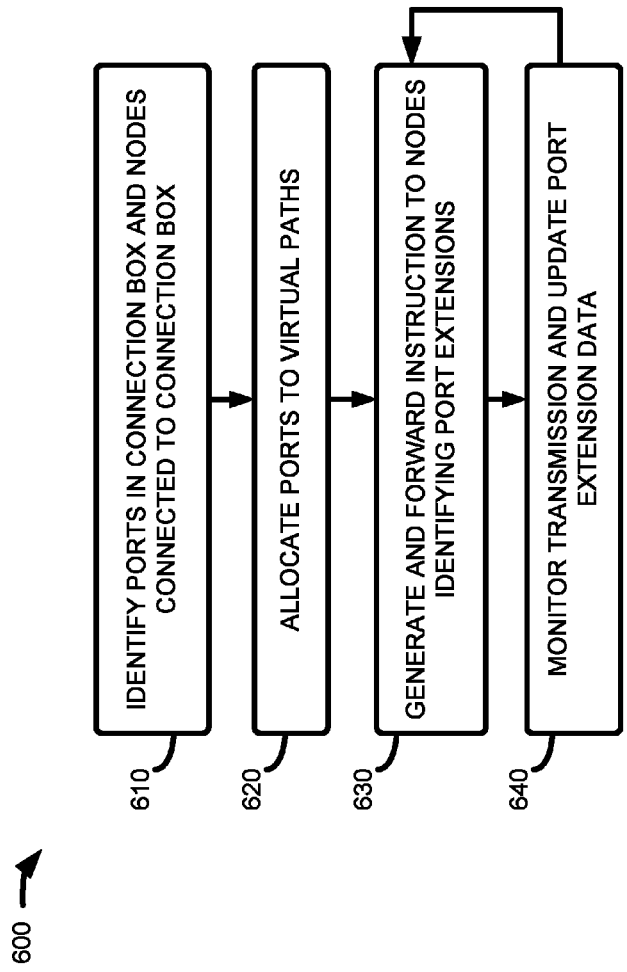
FIG. 6 is a flowchart of a process for establishing a virtual node in the environment of FIGS. 1A-1E.

FIG. 6 is a flowchart of a process 600 for establishing virtual node 101 according to an implementation described herein. In some implementations, process 600 may be performed by controller 110. In other implementations, some or all of process 600 may be performed by another device or a group of devices separate from and/or including controller 110.

As shown in FIG. 6, process 600 may include identifying ports in connection box 120 and nodes 130 connected to connection box 120 (block 610). For example, controller 110 may transmit, broadcast, and/or multicast test data to one or more devices (e.g., to client device 103 and/or server device 104) included in a range of addresses, and controller 110 may identify ports in connection box 120 and/or nodes 130 that are used to forward the test data to the devices and/or to transmit a response (e.g., an acknowledgement message) from the devices. In another example, controller 110 may receive status data from connection box 120 and/or nodes 130 using VDP under IEEE 802.1BR, and may further use the status data to identify ports in connection box 120 and/or nodes 130.

As shown in FIG. 6, process 600 may include allocating the identified ports to one or more virtual paths (block 620). For example, controller 110 may identify a set of the discovered ports in connection box 120 and/or nodes 130 that are available (e.g., functioning but not already allocated to another virtual path). Controller 110 may further select, as the virtual path, a subset of the available ports that combine to form a virtual path between a source device and a destination device associated with a data transmission (e.g., client device 103 and server device 104). In one implementation, controller 110 may associate multiple ports in connection box 120 and/or nodes 130 with a virtual path that may be used to multicast data to multiple destination devices.

When selecting the ports to include in the virtual path, controller 110 may further select from the available ports based on desired transmission characteristics. In one example, if controller 110 is configured to form a virtual path that that enables data transmission with less than a total transmission delay, controller 110 may select certain ports associated with desired levels of transmission delays. In this example, controller 110 may select available ports associated with transmission queues that are shorter than a desired maximum queue length to minimize transmission delays associated with the queues. In another example, controller 110 may form a virtual path that includes a combination of ports associated with a threshold bandwidth level. In this second example, controller 110 may select a combination of ports in parallel physical paths that combine to achieve the threshold bandwidth level.

In one implementation, controller 110 may identify ports associated with one or more connection box 120 and/or nodes 130 may form a virtual path that includes compatible ports. To identify compatible ports, controller 110 may, for example, select ports from connection box 120 and nodes 130 that are: (1) manufactured by the same vendor; (2) compatible with a particular protocol, coding scheme, or other technology, and/or (3) previously have been successfully used together in a virtual path to transmit data.

As shown in FIG. 6, process 600 may further include generating and forwarding port extension data 102 (e.g., control plane instructions) to connection box 120 and nodes 130 (block 630). For example, controller 110 may identify one or more virtual paths associated with a particular port included in a connection box 120 and a node 130, and controller 110 may forward port extension data 102 to enable the particular port to function as a PE with respect to the identified virtual paths. Thus, controller 110 may forward separate sets of port extension data 102 to different devices. The port extension data 102 may include, for example, information identifying physical paths associated with a virtual path, and a PE may use the port extension data 102 to forward tagged data associated with the virtual path.

As shown in FIG. 6, process 600 may include monitoring transmission of data via virtual paths associated with port extension data 102 and updating the port extension data 102 if needed (block 640). For example, controller 110 may monitor transmission on a virtual path to determine that the virtual path provides a threshold bandwidth or other desired transmission attribute. If the virtual path does not provide the desired transmission attribute, controller 110 may assign an additional port, remove a port, and/or reorder ports in the virtual path, and process 600 may return to block 630 to generate and forward modified port extension data 102.

In one implementation, controller 110 may receive feedback data from connection box 120 and/or nodes 130 as the data is transmitted via the virtual path, and controller 110 may update node extension data 102 and/or other control plane information substantially in real-time to reflect actual transmissions. For example, if controller 110 detects excess congestions and/or insufficient bandwidth over a virtual path, controller 110 may modify node extension data 102 to add, change and/or remove ports in box 120 and/or nodes 130 from the virtual node. In another implementation, controller 110 may further update node extension data 102 based on addition and/or different conditions. For example, if controller 110 detects a faulty device or other conditions outside of virtual node 101 that may interfere with data transmission, controller 110 may internally redirect a virtual channel in virtual node 101 so that traffic is directed away from the faulty device. In this way, a separate controller 110 and connection box 120 may more efficiently direct traffic than a single device performing functions associated with both control plane and data plane management.

Figure 7:
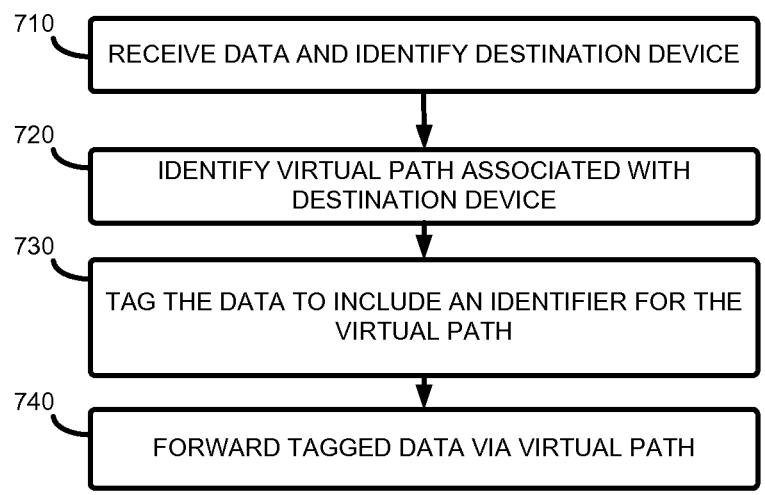
FIG. 7 is a flowchart of a process for handling received data based on port extension data generated by a controller in the environment of FIGS. 1A-1E.

FIG. 7 is a flowchart of a process 700 for handling received data based on port extension data 102. In some implementations, process 700 may be performed by a node 130. In other implementations, some or all of process 700 may be performed by another device or a group of devices (e.g., connection box 120) separate from and/or including node 130.

As shown in FIG. 7, process 700 may include receiving data and identifying a destination associated with the received data (block 710). For example, node 130 may receive a flow carrying data from client device 103 or server device 104. Node 130 may parse a data unit (e.g., a packet) to identify a destination device. For example, node 130 may inspect a header of the data unit to identify an address (e.g., a MAC address) associated with the destination device.

As shown in FIG. 7, process 700 may further include identifying a virtual path associated with the destination (block 720) and modifying the data to include an identifier for the virtual path (block 730). For example, node 130 may examine the port extension data 102 to identify a virtual path leading to the MAC address for the destination device. Node 130 may modify a header of the data to insert a tag (e.g., an E-tag) that includes an identifier (e.g., an ECID) for the virtual path.

As shown in FIG. 7, process 700 may also include forwarding the modified data via the virtual path (block 740). For example, node 130 may access port extension data 102 to identify a PE associated with the virtual path. With reference to FIG. 4, the PE may be associated, for example, with a particular connection box-side port 410 if the virtual path includes connection box 120 or with a particular blade-side port 430 if the virtual path includes client device 103 and/or server device 104.

Certain embodiment provided herein provide virtual node 101 that includes a controller 110 for managing control plane functions and a connection box 120 and switches 130 for managing data plane functions. Virtual node 101 may provide a larger switching backbone system, as well as power and space savings in comparison to single device that performs both data plane and control plane management. Furthermore, virtual node 101 enables an associated service provider to more efficiently process and forward data.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6-7, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a virtual node, comprising:
   managing, by a controller device, control plane operations in the virtual node, wherein the control plane operations comprise:
   identifying, by a processor executing instructions stored in a memory associated with the controller device, a first set of ports included in an inbound node, a second set of ports included in a port extender device, and a third set of ports included in an outbound node,
      wherein the inbound node, the port extender device, and the outbound node are selected based on a determination that the inbound node, the port extender device, and the outbound node are manufactured by a same manufacturer,
      wherein the controller device is coupled to the inbound node and the outbound node via the port extender device, and
      wherein the inbound node connects to a source device via an external network, and the outbound node connects to a destination device via the external network;
   allocating, by the processor, the first set of ports, the second set of ports, and the third set of ports to form a virtual path for a data transmission between the source device and the destination device, wherein the virtual path is associated with a layer two connection through the virtual node to the destination device;
   generating, by the processor, port extension data identifying the virtual path and the first set of ports, the second set of ports, and the third set of ports; and
   forwarding, by the processor, the port extension data to the port extender device, the inbound node, and the outbound node; and
   managing, by the port extender device, the outbound node, and the inbound node, data plane operations associated with the data transmission in the virtual node, wherein the data plane operations comprise:
   receiving, at the inbound node and from the source device, a data unit that is addressed to the destination device;
   accessing, by a processor executing instructions stored in a memory associated with the inbound node, the port extension data to identify the first set of ports, the second set of ports, and the third set of ports;
   forwarding, via one of the first set of ports, the data unit to the port extender device;
   receiving, at the port extender device, the data unit via one of the second set of ports;
   forwarding, by the port extender device, the data unit to the outbound node via another one of the second set of ports;
   receiving, at the outbound node, the data unit via one of the third set of ports; and
   forwarding, by the outbound node, the data unit to the destination device via another one of the third set of ports.

2. The method of claim 1, wherein at least one of the inbound node or the outbound node includes a top-of-rack (TOR) switch.

3. The method of claim 1, wherein the inbound node is further configured to modify the data unit to include information identifying the virtual path, and wherein the inbound node is further configured to forward the modified data unit to the port extender device through the one of the first set of ports.

4. The method of claim 1, wherein identifying the first set of ports, the second set of ports, and the third set of ports further comprises:
   selecting the first set of ports, the second set of ports, and the third set of ports based on a determination that a threshold level of bandwidth is associated with the virtual path.

5. The method of claim 4, wherein selecting the second set of ports further includes:
   identifying transmission characteristics associated with the second set of ports; and
   selecting the second set of ports based on the transmission characteristics.

6. The method of claim 1, further comprising:
   monitoring a transmission of the data unit via the virtual path; and
   modifying, by the inbound node, the port extension data based on monitoring the transmission of the data unit via the virtual path, wherein the modified port extension data causes at least one of the first set of ports, the second set of ports, or the third set of ports to be removed from the virtual path.

7. A system comprising:
a port extender device, an outbound node, and an inbound node configured to manage data plane operations associated with data transmission in a virtual node; and a controller device configured to manage control plane operations in the virtual node, comprising:
one or more memories configured to store instructions; and
one or more processors configured to execute one or more of the instructions to:
identify a first set of ports included in the inbound node, a second set of ports included in the port extender device, and a third set of ports included in the outbound node,
wherein the inbound node, the port extender device, and the outbound node are selected based on a determination that the inbound node, the port extender device, and the outbound node are manufactured by a same manufacturer,
wherein the controller device is coupled to the inbound node and the outbound node via the port extender device, and
wherein the inbound node connects to a source device via an external network, and the outbound node connects to a destination device via the external network,
allocate the first set of ports, the second set of ports, and the third set of ports to form a virtual path for the data transmission between the source device and the destination device, wherein the virtual path is associated with a layer two connection through the virtual node to the destination device,
generate port extension data identifying the virtual path and the first set of ports, the second set of ports, and the third set of ports;
forward the port extension data to the port extender device, the inbound node, and the outbound node;
receive, at the inbound node and from the source device, a data unit that is addressed to the destination device;
access, by the inbound node, the port extension data to identify the first set of ports, the second set of ports, and the third set of ports;
forward, via one of the first set of ports, the data unit to the port extender device;
receive, at the port extender device, the data unit via one of the second set of ports;
forward, by the port extender device, the data unit to the outbound node via another one of the second set of ports;
receive, at the outbound node, the data unit via one of the third set of ports; and
forward, by the outbound node, the data unit to the destination device via another one of the third set of ports.

8. The system of claim 7, wherein at least one of the inbound node or the outbound node includes a top-of-rack (TOR) switch.

9. The system of claim 7, wherein the inbound node is further configured to modify the data unit to include information identifying the virtual path, and wherein the inbound node is further configured to forward the modified data unit to the port extender device through the one of the first set of ports.

10. The system of claim 7, wherein to identify the first set of ports, the second set of ports, and the third set of ports the one or more processors are further configured to execute one or more of the instructions to:
select the first set of ports, the second set of ports, and the third set of ports based on a determination that a threshold level of bandwidth is associated with the virtual path.

11. The system of claim 10, wherein the one or more processors, when selecting the second set of ports, are further configured to:
identify transmission characteristics associated with the second set of ports, and
select the second set of ports based on the transmission characteristics.

12. The system of claim 7, wherein the one or more processors are further configured to execute one or more of the instructions to:
monitor a transmission of the data unit via the virtual path, and
modify the port extension data based on monitoring the transmission of the data unit via the virtual path, wherein the modified port extension data causes another port included in the inbound node, the port extender device, or the outbound node to be assigned to the virtual path.

13. Non-transitory computer-readable media configured to store instructions, the instructions comprising:
one or more instructions that, when executed by one or more processors associated with a port extender device, an inbound node, an outbound node, and a controller device in a virtual node, cause the one or more processors to:
identify a first set of ports included in the inbound node, a second set of ports included in the port extender device, and a third set of ports included in the outbound node,
wherein the inbound node, the port extender device, and the outbound node are selected based on a determination that the inbound node, the port extender device, and the outbound node are manufactured by a same manufacturer,
wherein the controller device is coupled to the inbound node and the outbound node via the port extender device, and
wherein the inbound node connects to a source device via an external network, and the outbound node connects to a destination device via the external network,
allocate the first set of ports, the second set of ports, and the third set of ports to form a virtual path for a data transmission between the source device and the destination device, wherein the virtual path is associated with a layer two connection through the virtual node to the destination device,
generate port extension data identifying the virtual path and the first set of ports, the second set of ports, and the third set of ports;
forward the port extension data to the port extender device, the inbound node, and the outbound node;
receive, at the inbound node and from the source device, a data unit that is addressed to the destination device;
access, by the inbound node, the port extension data to identify the first set of ports, the second set of ports, and the third set of ports;
forward, via one of the first set of ports, the data unit to the port extender device;

receive, at the port extender device, the data unit via one of the second set of ports;

forward, by the port extender device, the data unit to the outbound node via another one of the second set of ports;

receive, at the outbound node, the data unit via one of the third set of ports; and forward, by the outbound node, the data unit to the destination device via another one of the third set of ports.

14. The non-transitory computer-readable media of claim 13, wherein at least one of the inbound node or the outbound node includes a top-of-rack (TOR) switch.

15. The non-transitory computer-readable media of claim 13, wherein the port extension data is formatted in accordance with Institute of Electrical and Electronic Engineer (IEEE) 802.1BR protocol.

16. The non-transitory computer-readable media of claim 13, wherein the port extension data causes the inbound node to modify the data unit to include information identifying the virtual path, and wherein the port extension data causes the inbound node to forward the modified data unit to the port extender device through the one of the first set of ports.

17. The non-transitory computer-readable media of claim 13, wherein to identify the first set of ports, the second set of ports, and the third set of ports the one or more instructions further cause the one or more processors to:

select the first set of ports, the second set of ports, and select the third set of ports based on a determination that a threshold level of bandwidth is associated with the virtual path.

18. The non-transitory computer-readable media of claim 17, wherein the one or more instructions, when executed by the one or more processors to select the second set of ports, further cause the one or more processors to:

identify transmission characteristics associated with the second set of ports, and select the second set of ports based on the transmission characteristics.

19. The non-transitory computer-readable media of claim 13, wherein the inbound node is further configured to modify the data unit to include information identifying the virtual path, and wherein the inbound node is further configured to forward the modified data unit to the port extender device through the one of the first set of ports.

20. The non-transitory computer-readable media of claim 13, wherein the one or more instructions, when executed by the one or more processors, further cause the one or more processors to:

monitor a transmission of the data unit via the virtual path; and modify the port extension data based on monitoring the transmission of the data unit via the virtual path, wherein the modified port extension data causes at least one of the first set of ports, the second set of ports, or the third set of ports to be removed from the virtual path.

* * * * *